April 6, 1937.                V. A. DOTY                2,076,450
                            FLOWERPOT COVER
                           Filed July 13, 1936
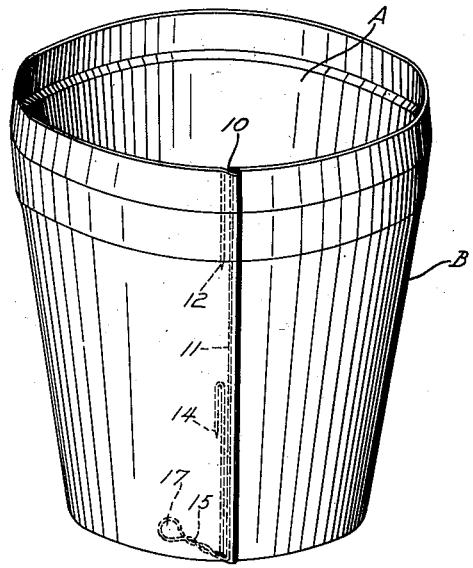
Fig. 1
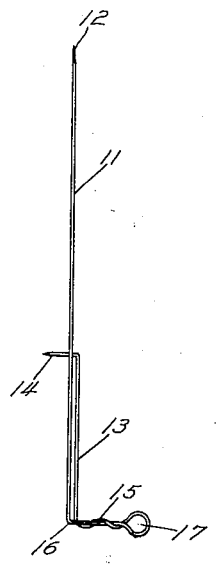 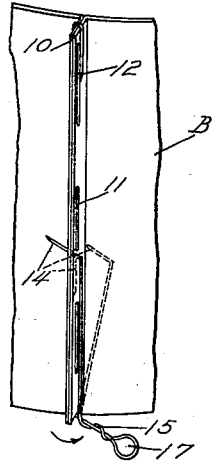 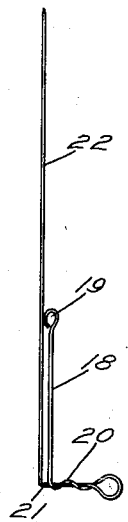 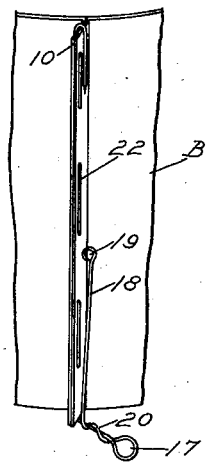
Fig. 2    Fig. 3        Fig. 4    Fig. 5
Vernon A. Doty
INVENTOR
BY Victor J. Evans & Co.
ATTORNEYS Patented Apr. 6, 1937

2,076,450

UNITED STATES PATENT OFFICE 2,076,450

FLOWERPOT COVER

Vernon A. Doty, West Springfield, Mass.

Application July 13, 1936, Serial No. 90,403

4 Claims. (Cl. 47—34)

The invention relates to a receptacle, cover or jacket and more especially to flower pot covers and fasteners therefor.

The primary object of the invention is the provision of a cover or jacket of this character, wherein the same is made from flexible material such as paper, fabric or the like and when trained about a receptacle or pot can be made fast and secure in a novel manner so as to render such receptacle or pot neat in appearance and also conceals the unsightly outer surface of the receptacle or pot ordinarily used for potted plants, flowers or the like.

Another object of the invention is the provision of a cover or jacket of this character, wherein through the use of a pin the same can be fastened about a pot or receptacle and held in place thereon and in this manner avoiding the necessity for use of a number of fastening mediums and at the same time avoiding the accidental separation of the cover or jacket from the pot or receptacle.

A further object of the invention is the provision of a cover or jacket of this character, wherein the meeting edges thereof when brought together can be pinned for the secure fastening of these edges together with the cover or jacket about a pot or receptacle.

A still further object of the invention is the provision of a cover or jacket of this character, which is simple in construction, thoroughly reliable and effective in its operation, strong, durable and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a perspective view of a cover or jacket constructed in accordance with the invention and fastened to a flower pot.

Figure 2 is a side elevation of the fastening pin.

Figure 3 is a fragmentary perspective view showing the manner of application of the pin to the cover or jacket.

Figure 4 is a view similar to Figure 2 showing a slight modification of pin.

Figure 5 is a view similar to Figure 3 showing the modified form of pin engaged with the cover or jacket.

Similar reference characters indicate corresponding parts throughout the several views in the drawing.

Referring to the drawing in detail, particularly Figures 1 to 3 inclusive, A designates generally a flower pot about which is trained a cover or jacket B preferably made from paper although it may be made from fabric or other suitable flexible material. This cover or jacket is in sheet form and is trained exteriorly about the pot A, being drawn tightly about the latter with the edges 10 meeting each other and turned outwardly in contacting parallel relation to each other to provide pin receiving flanges or tongues so that the cover or jacket can be secured upon the pot in its wrapped relation thereto.

Insertable through the edges 10 when outturned and in contacting parallel relation with each other is a pin 11, it having the pointed end 12 and an opposite terminal catch or hook end 13 which is constituted by folding the single length of wire from which the pin 11 is made on itself. When the major length of the pin 11 is threaded through the edges 10 back and forth these will be fastened together and the end 12 of such pin is turned downwardly and inwardly against the outer side face of one of the flanges 10 so that such pin can not become unthreaded from these edges on the application thereof. The terminal or end hook 13 is freely flexible so that its piercing prong or tip 14 can be forced through the edges 10 and bent against one of the same for the securing of this terminal or hook 13 in place. The terminal or hook 13 has the twist 15 about a right angular portion 16 of the pin 11 and such twist 15 terminates in an eye 17 so that the right angular portion 16 may be provided with a convenient extremity by which the angular portion may be turned as a crank to roll the connected edges of the cover together and thus contract it circumferentially around the enclosed pot.

In Figures 4 and 5 of the drawing there is shown a slight modification of pin, wherein in lieu of the catch terminal or hook 13 there is provided the arm 18 having a free eye terminal 19 and this arm has the twist 20 about the right angular portion 21 of the pin 22, the application of the latter being clearly shown in Figure 5 of the drawing for the fastening of the cover or jacket about a receptacle or pot.

The angular portion 15 in Figures 1 to 3 and the similar portion 20 in Figures 4 and 5 of the drawing can be folded inwardly and upwardly beneath the lowermost edge of the cover or jacket to lie against the inner face of said jacket or cover and thereby hold the edges originally in out-turned position close to the outer side of said cover or jacket and thus prevent undue protruding of these edges when the cover or jacket is about the flower pot or receptacle.

What is claimed is:

1. A cover of the character described comprising a piece of sheet-like flexible fabric material rolled on itself for encircling a receptacle externally thereof with the ends on said sheet of material arranged in contact with each other, and a bendable pin laced back and forth through said ends and having terminal portions bent over and around opposite extremities of the latter for the fastening of the ends of said sheet together.

2. A cover of the character described comprising a piece of sheet-like flexible fabric material rolled on itself for encircling a receptacle externally thereof with the ends on said sheet of material arranged in contact with each other, a bendable pin laced back and forth through said ends and having terminal portions bent over and around opposite extremities of the latter for the fastening of the ends of said sheet together, and a hook formed from one extremity of said pin for penetrating the ends of said sheet and for bending in interlocking engagement therewith.

3. A cover of the character described comprising a piece of sheet-like flexible fabric material rolled on itself for encircling a receptacle externally thereof, out-turned ends on said sheet of material and arranged in abutting relation to each other, a bendable pin laced back and forth through said ends and having terminal portions bent over and around opposite extremities of the latter for the fastening of the ends of said sheet together, and an arm twisted from one extremity of said pin, the twisted portion of said arm forming an eye.

4. A cover of the character described comprising a piece of sheet-like flexible material rolled on itself to encircle a receptacle externally thereof with the ends of said sheet of material arranged in contact with each other, and a bendable pin laced back and forth through said ends and having an angular terminal to permit rotation of the pin to coil the ends and circumferentially contract said sheet.

VERNON A. DOTY.